M. G. McGUIRE.
CUSHIONING DEVICE FOR VEHICLES.
APPLICATION FILED AUG. 9, 1910. RENEWED AUG. 10, 1911.
1,005,449.
Patented Oct. 10, 1911.
3 SHEETS—SHEET 1.
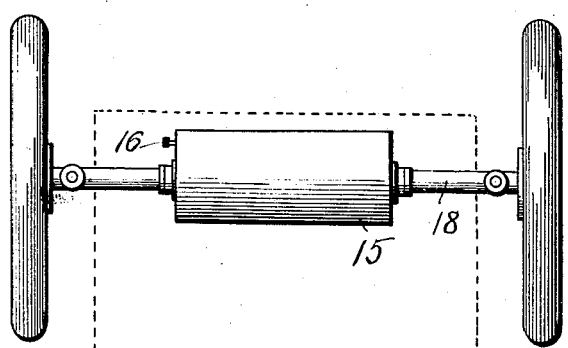
FIG. 1.
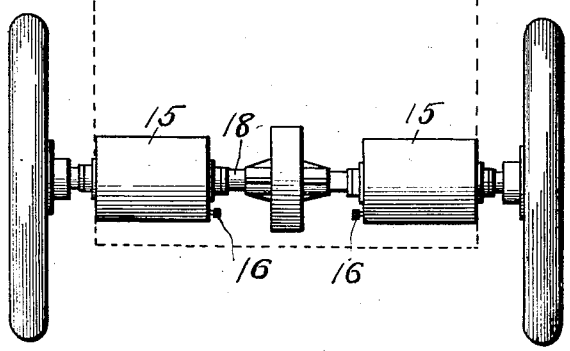
WITNESSES:
INVENTOR
M. G. McGuire
BY
Nicholas L. Bogan
his Attorney

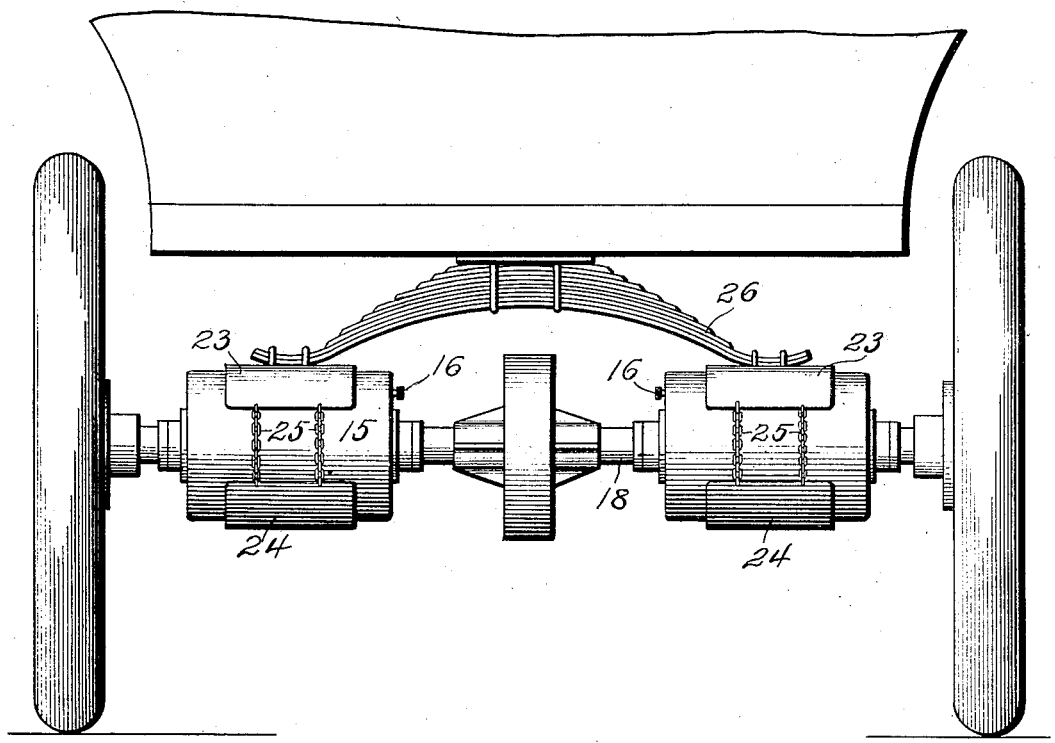
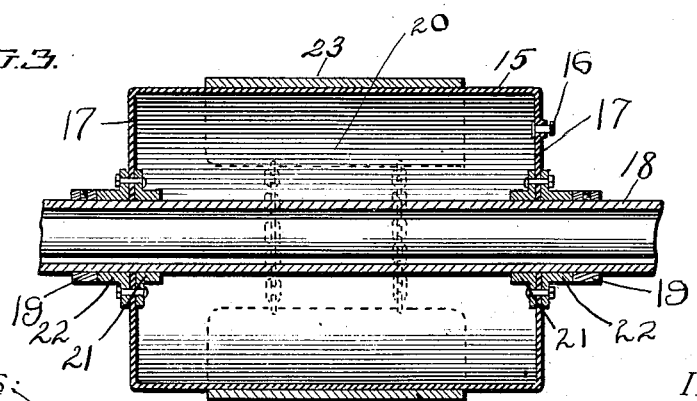

M. G. McGUIRE.
CUSHIONING DEVICE FOR VEHICLES.
APPLICATION FILED AUG. 9, 1910. RENEWED AUG. 10, 1911.
1,005,449.
Patented Oct. 10, 1911.
3 SHEETS—SHEET 3.
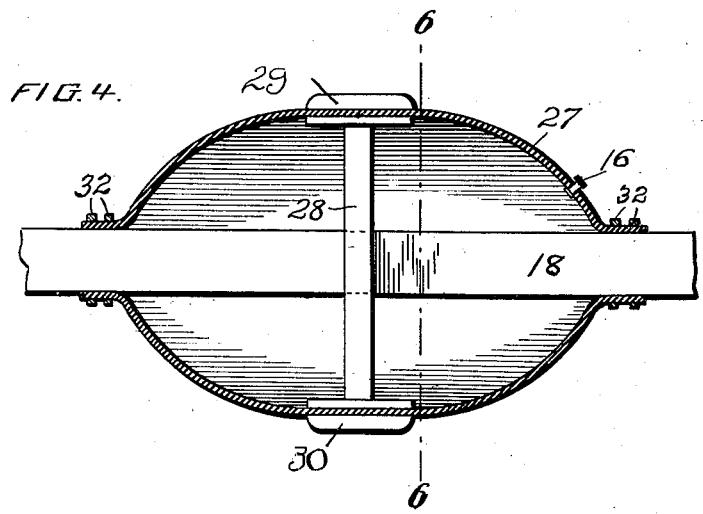
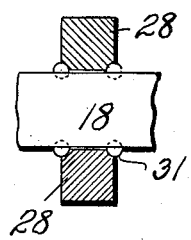
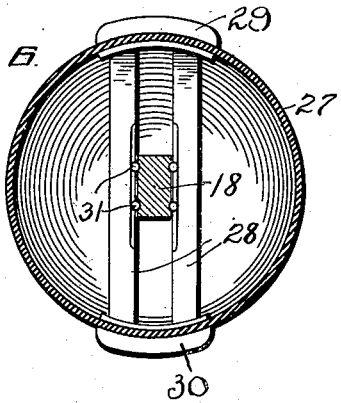
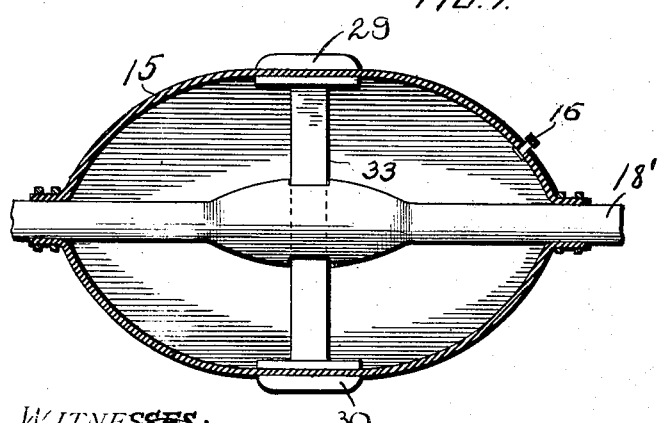
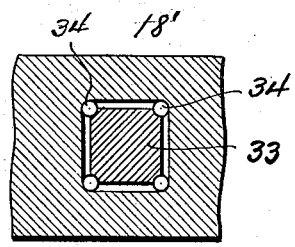

UNITED STATES PATENT OFFICE.

MICHAEL G. McGUIRE, OF CHICAGO, ILLINOIS.

CUSHIONING DEVICE FOR VEHICLES.

1,005,449.  Specification of Letters Patent.  Patented Oct. 10, 1911.

Application filed August 9, 1910, Serial No. 576,287. Renewed August 10, 1911. Serial No. 643,402.

*To all whom it may concern:*

Be it known that I, MICHAEL G. MCGUIRE, a citizen of the United States, residing at Chicago, in the county of Cook and State of Illinois, have invented certain new and useful Improvements in Cushioning Devices for Vehicles, of which the following is a specification.

This invention relates to certain new and useful improvements in cushioning means for vehicles, and has for its main object to provide for the cushioning of the body of the vehicle in such manner as to effectually absorb all shock ordinarily caused by the springs reaching their full state of compression and the force of the blow being thereby transmitted to an unyielding element, as the axles of the vehicle.

A further object of the invention is to provide a cushioning, shock-absorbing means between the spring of the vehicle and the axles thereof, pneumatic in its nature, and thus obviate the necessity for the employment of cushioning means for the axles of the vehicle, such as the employment of the ordinary pneumatic tires.

The invention while particularly designed and adapted for use in connection with automobiles, is by no means confined to this specific use, but may be advantageously employed in connection with any vehicle employing a spring supported body.

My improvement consists in employing between the springs of the vehicle and the axle thereof and surrounding the axle, a yielding pneumatic tube mounted on the axle, and with which tube the springs of the vehicle are connected and so arranged and disposed that the movement of the vehicle body in either direction, is transmitted by the springs either into pressure upon or pull against the cushioning elements, whereby the cushion ordinarily provided by the pneumatic tire is obtained directly at the point where the jar would ordinarily be transmitted to the axles of the vehicle.

In the accompanying drawings, I have shown and will describe in detail, different embodiments of my invention, and in describing the invention in detail, reference will be had to the drawings, like parts being indicated by like reference numerals throughout, without in any manner however confining myself to the details of construction shown.

In the drawings:—Figure 1 is a top plan showing the adaptation of cushioning elements in accordance with this inventon in connection with the front and rear axles of a vehicle, Fig. 2 is a rear elevation of a vehicle showing a pair of cushioning elements in accordance with this invention as applied to the rear axles of the vehicle, Fig. 3 is a longitudinal sectional view of a cushioning element showing the adaptation therewith in connection with the axle of a vehicle, Fig. 4 is a longitudinal sectional view of a modified form, Fig. 5 is a horizontal sectional view of the form shown in Fig. 4, Fig. 6 is a vertical transverse section of the forms shown in Fig. 4, Fig. 7 is a longitudinal sectional view of another modified form, and Fig. 8 is a horizontal section of the form shown in Fig. 7.

In Figs. 1 to 3, there is shown a preferred embodiment of my invention, Fig. 1 showing the adaptation of two of the cushioning elements to the rear axle, one for each spring of the vehicle, and also showing a single cushioning element on the front axle of the vehicle. Obviously, however, I do not wish to limit myself to this arrangement of the cushioning elements, or to the number of such elements used, as this will depend almost entirely on the type of springs used on the vehicle, and upon the size and weight of the vehicle body. In the longitudinal sectional view of one of the cushioning elements as shown in Fig. 3, the same is illustrated as mounted upon the rear axle of a vehicle, the usual type of rear axle being shown, the cushioning element being secured to the surrounding sleeve or tube of the axle, and it will be apparent that where mounted upon the front axle, which is ordinarily a one piece structure instead of an inner and outer structure as in the case of the rear axle, that the cushioning element will be secured to the front axle in the same manner as is shown for securing the same to the outer member of the rear axle in said figure.

The cushioning element as herein shown is designated generally by the reference numeral 15, and is in the form of a tube, casing or cylinder provided at one end, or at any other suitable point with an air inlet valve 16 for connection with an air supply, as a pump or compressed air supply. This element is generally formed of reinforced rubber, that is, vulcanized rubber and canvas layers in order to give sufficient strength and rigidity to the element.

The heads or ends 17 of the element are centrally apertured to permit of the element being passed onto the axle 18, on which it is firmly secured when positioned thereon, by a nut 19, or any suitable means, the air chamber 20 within the element being made air-tight by inner and outer rings 21, 22, respectively. I do not limit myself herein to any specific construction for effecting an air-tight joint around the ends of the cushioning element, or to any specific means for securing the cushioning element in position on the axle, as obviously such details may be varied at will as may be found desirable.

On the upper and lower faces of the cushioning element I provide plates or shoes 23, 24, respectively. These are so shaped preferably, as to fit with the contour of the cushioning element, and are connected on opposite sides of the element by flexible straps 25, one or more of which may be employed on each side, and which may be in the form of chains, leather straps, or the like.

The plates or shoes 23, 24, are suitably secured to the tube or casing so as to prevent end-wise or side-wise movement of the plates or shoes on the tube or casing, and the plate or shoe 23 constitutes a seat for the spring 26 of the vehicle body, the spring being secured to said shoe in any suitable or desired manner. Obviously, where the springs of the vehicle are of a type which will render it inconvenient to attach them to the shoe 23, but would however permit of attachment to the lower shoe, this shoe may be made the spring attaching one, the operation of the device being the same, whether the springs be attached to the upper or lower shoe.

With the above described construction, it will be obvious that with the cushioning element filled with compressed air to the desired pressure, a compression of the springs of the vehicle will be transmitted to the cushioning element, the upper portion thereof depressing to the extent permitted by the pressure of air in the element, and should the action thereon be a pulling one instead of a pressure against the element, the operation of the element is the same,—the lower portion compressing to the extent permitted by the pressure of air in the element. This is due to the flexible connection between the shoes 23, 24, such connections simply slackening when pressure is applied to the shoe to which the springs are connected.

With the construction shown in Figs. 4, 5, and 6, I dispense with the flexible connections between the shoes outside the element, and in lieu thereof, provide, inside the element 27, two vertical bars 28 attached at their ends to the upper shoe 29, and to the lower shoe 30. One or the other of these shoes has the springs of the vehicle attached thereto in a suitable manner, as in the construction aforedescribed. The said two bars 28 are arranged in parallel spaced relation to each other and straddle the axle 18, anti-friction ball or roller bearings 31 being provided between the bars and the axle so as to reduce the friction to a minimum. The cushioning element of this form is suitably secured at its ends as at 32, to form an air-tight connection with the axle, and, like the construction aforedescribed, is provided with an air inlet valve 16 for connection with a pump or other suitable source of air supply. As pressure is applied to either the upper or lower side of the cushioning element the element resists such pressure according to the pressure of the air supply in the chamber.

In the construction shown in Figs. 7 and 8, the operation is the same as that shown in the construction illustrated in Figs. 4 to 6, the difference in construction being that instead of providing two bars to straddle the axle, I provide a single bar 33 which passes through the axle 18', and, like the other modified construction described, is provided with antifriction rollers or balls 34 to reduce the friction to a minimum.

With any and all of the constructions described, it will be observed that there is provided a pneumatic cushion surrounding the axle at the point or points where the jar would be transmitted to the same, and thus this jar or shock is entirely taken up at this point or points, both in the downward and in the upward movement of the vehicle body, so that necessity for cushioning means (as pneumatic tires) on the wheels to absorb the jar transmitted to the axles is obviated.

While I have herein illustrated and described different embodiments of my invention, yet I do not wish to be understood as confining myself to such constructions, as it is apparent that they may be varied without departing from the underlying generic invention involved in each construction shown, namely,—that of providing a cushioning element between the axle and the springs of the vehicle body, such element surrounding the axle so as to form a cushion for the vehicle body in either the upward or downward movement of such body.

Although I have herein illustrated the cushioning elements as connected to the springs of the vehicle, yet it is to be understood that the body of the vehicle can be mounted directly upon the cushioning elements, the said elements possessing sufficient rigidity so they can be used in lieu of the vehicle springs thereby not only obtaining the function of the springs, but also an additional cushioning function owing to the manner in which the cushioning elements are set up.

By setting up the cushioning elements in the manner as set forth, that is to say, with respect to the axles and springs, it overcomes the loosening or unfastening of the hold-fast devices for the ends of the springs, as well as the separating or spreading of the sections of the springs, when these latter are of laminated form. The loosening or unfastening of the hold-fast devices is due to the transmission of pressure from the springs to the hold-fast devices when weight is applied to the springs. This constant application of pressure upon the hold-fast devices tends to loosen or unfasten them and results in the spreading or separating of the sections of the springs, when these latter are in laminated form, thereby causing the loosening of the joints of the elements of the vehicle, but by disposing the cushioning devices in the manner as shown, they receive the pressure from the springs in lieu of the hold-fast devices.

What I claim is:—

1. A cushioning device for vehicles comprising a pneumatic cushioning element surrounding and secured to the axle of the vehicle and with the air in contact with the axle, shoes secured to the upper and lower faces of said element, flexible connections on opposite sides of the element connecting said shoes, and means connecting one of the shoes with the springs of the vehicle.

2. In combination, a plurality of cushioning elements each including a fluid containing receptacle, an axle extending medially of and secured to the ends of each of said receptacles and with the fluid in contact with the axle, and vertically movable means connected with said receptacles and with the body of the vehicle whereby the cushioning elements act to cushion the body of the vehicle when the axle moves upwardly and downwardly due to obstruction or uneven road surfaces.

In testimony whereof I affix my signature in presence of two witnesses.

MICHAEL G. McGUIRE.

Witnesses:
R. M. PARKER,
A. M. WILSON.